(No Model.) 2 Sheets—Sheet 1.
W. FONGER.
REEL FOR HARVESTERS.
No. 452,369. Patented May 19, 1891.
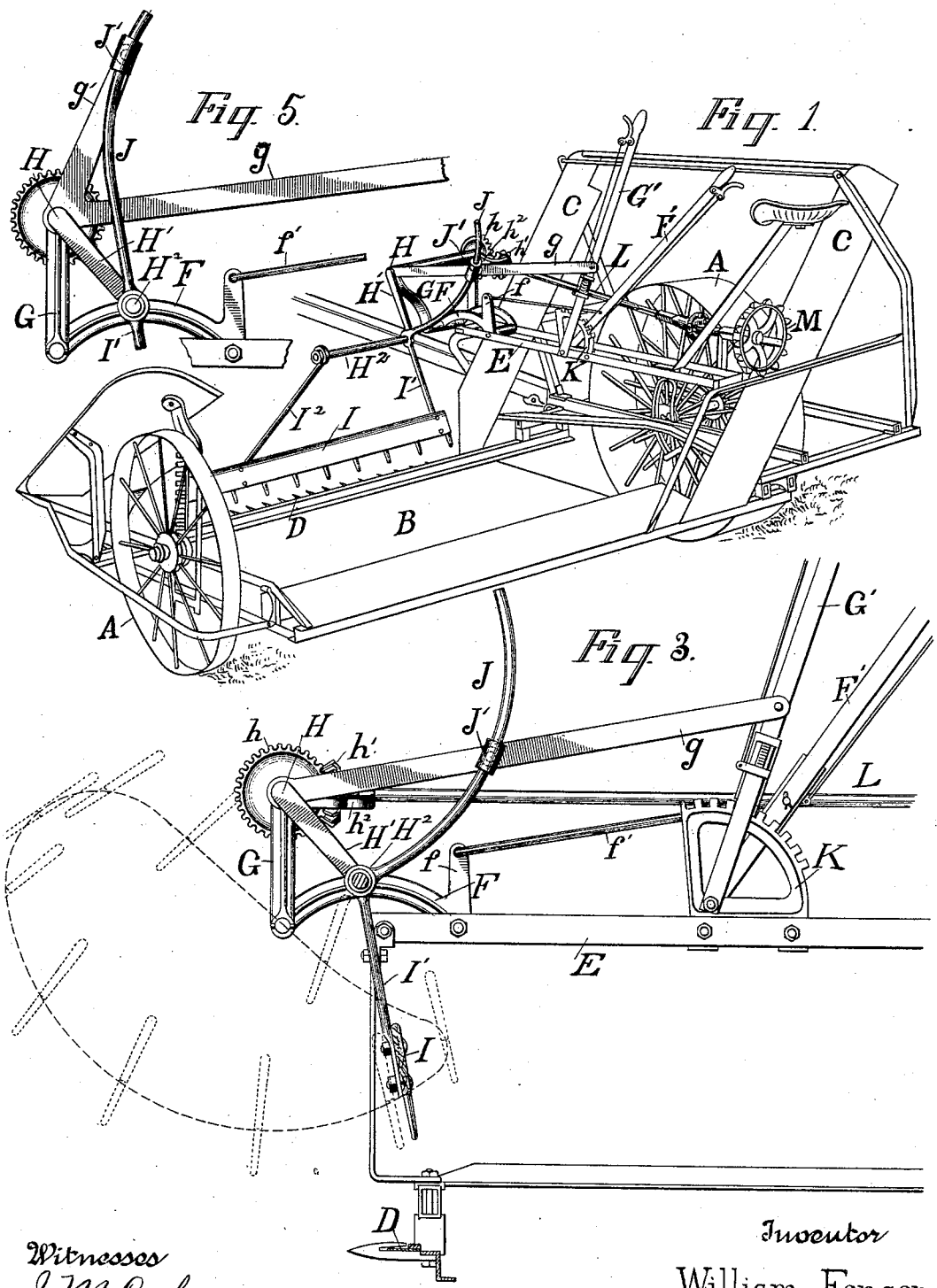
Witnesses
J. M. Culver
F. A. Ericsson
Inventor
William Fonger
By his Attorney
R. B. Swift

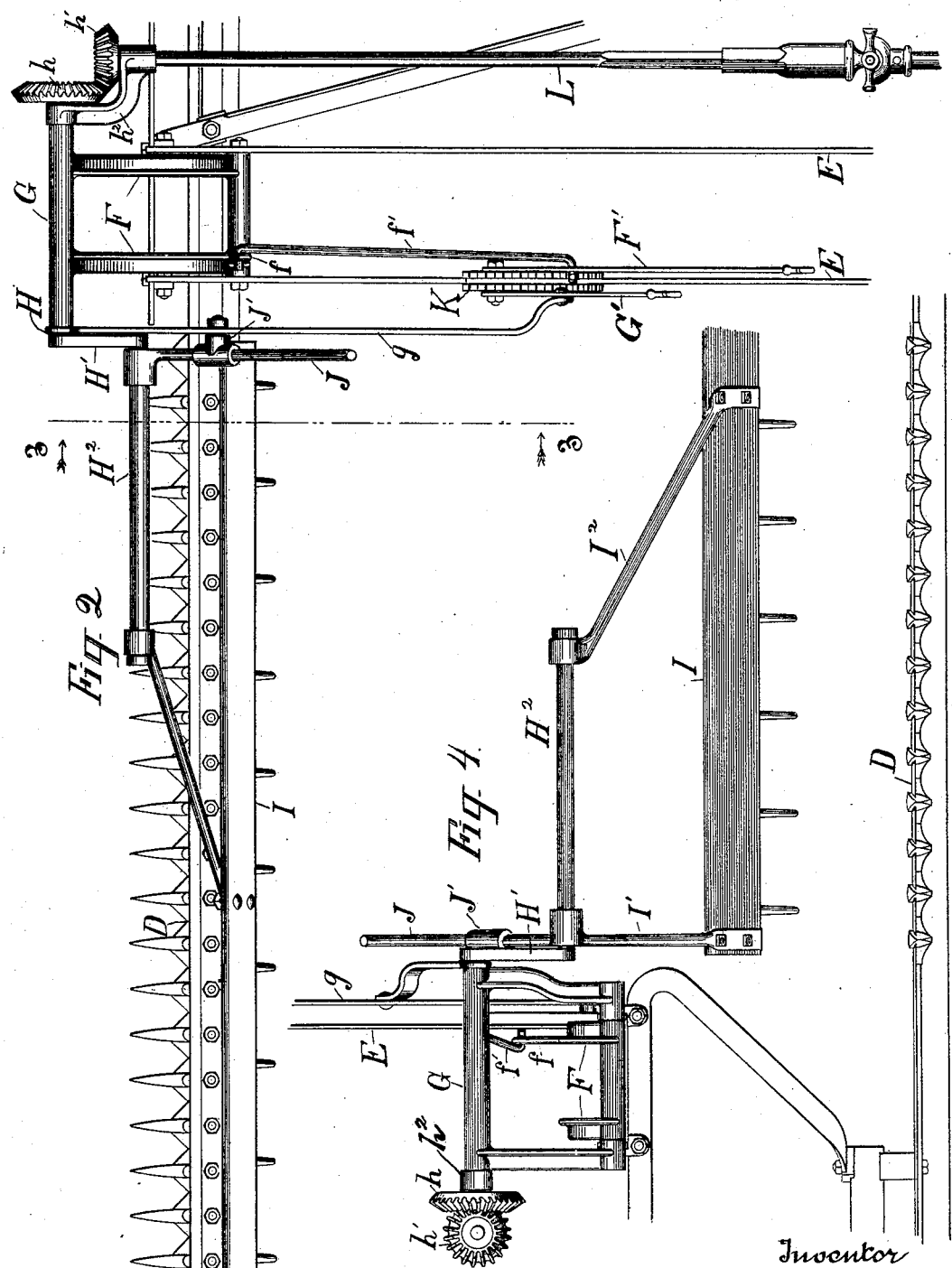

UNITED STATES PATENT OFFICE.

WILLIAM FONGER, OF CHICAGO, ILLINOIS.

REEL FOR HARVESTERS.

SPECIFICATION forming part of Letters Patent No. 452,369, dated May 19, 1891.

Application filed June 28, 1890. Serial No. 357,063. (No model.)

*To all whom it may concern:*

Be it known that I, WILLIAM FONGER, a citizen of the United States, residing at Chicago, county of Cook, and State of Illinois, have invented a new and useful Reel for Harvesters, of which the following is a specification.

My invention relates to an improvement in reels for harvesters, and has for its object the providing of a simple, easily-operated reel that can, if desired, be placed in various positions by being mounted in a double frame, and which is so controlled in its movement that its speed will vary during different intervals in its rotation and whose path is such that it will enter the grain well ahead of the cutting mechanism, pick up the grain and support it for the knife, and leave it tilted to fall upon the platform without throwing and scattering it to the rear of the harvester.

In the drawings forming a part of this specification, Figure 1 is a perspective view of the frame-work of a harvester with my improved reel attached thereto. Fig. 2 is a top view of reel and the parts by which it is attached to the harvester and its position controlled. Fig. 3 is an end view on the line 3 3 of Fig. 2, and in dotted lines shows the path of the reel and the distance through which it moves during equal intervals of time. Fig. 4 is a front view of the reel. Fig. 5 is a modification showing position of the pivoted guide for the controlling-arm changed so as to vary the path in which the reel-board moves.

Referring to the lettered parts of the drawings, A, B, C, and D are respectively the wheels, platform, elevator, and cutting mechanism of a harvester.

E is the cross-girt, commonly called the "seat-girt," and pivoted to it is the lower arm F of the double reel-frame. The upper arm G of the reel-frame is pivoted at its lower end to the arm F, and journaled in its upper end is the reel-shaft H, which is bent, forming the arm H', and extended outwardly to form the extended wrist $H^2$ of a crank, with the necessary sweep to carry the reel-board I, which is pivoted upon it, into and out of the grain. The construction of the crank-shaft H, supported by a double frame, has been shown and described because most of the harvesting-machines now made use the double reel-frame. However, this mounting is not necessary to my invention, as the shaft H could be rigidly mounted on the harvester or on a jack or lever of only one arm in any of the many well-known ways. Rigidly bolted to the board I are the arms I' and $I^2$, by which the board is pivoted upon the arm of the reel-shaft $H^2$. Rigidly connected with the reel-board I and in the embodiment of the invention shown in the drawings, a continuation of the arm I' is a controlling-arm J, which freely moves through a pivoted guide J', attached to the machine.

The double-hinged reel-frame F G is controlled by separate levers in the preferable form of my invention, though a compound-lever arrangement common to both would be applicable. The lower arm F of the reel-frame has extended from it an arm $f$, which is connected to the lever F' by the rod $f'$. The lever F' is pivoted to the seat-girt E, convenient to the driver's reach, and is retained in position by its pawl dogging one row of the notches in the segment-rack K. When the lever F' is moved back and forth, it raises the reel up or drops it down into the grain. The upper arm G of the double reel-frame is controlled by a rod $g$, extending therefrom to a lever G', conveniently pivoted to the seat-girt E for the driver and retained in position by its pawl dogging another row of notches in the segment-rack K. When the lever G' is moved back and forth, the arm G of the double reel-frame is moved back and forth, thus reaching farther forward into the grain or carrying the grain farther back upon the platform.

Motion is transmitted to the reel-shaft H from the machine through any of the many well-known ways of chains and tumbling-shafts. I show, however, a bevel-wheel $h$, keyed upon the reel-shaft H, and a corresponding wheel $h'$ on the telescoping tumbling-shaft L. A suitable connection $h^2$, sleeved upon the arm G of the reel-frame, furnishes the bearing for the shaft L and holds the gear-wheels in mesh. The telescoping end of shaft L is connected by a gimbal-joint with the sprocket-wheel M, that receives its motion from the harvester.

Upon the position of the pivoted guide J' and the curvature of the arm J depends the path of the reel-board I. Should the guide J' be attached to a fixed part of the harvester and the reel-frame moved, the path of the board would change with each movement and the operation of the reel would not be as satisfactory as though it more nearly retained the same path as it does when attached to the controlling-rod $g$, when, because of the movement of the rod $g$, it partakes partially of the movement of the reel-shaft itself.

In Fig. 5 of the drawings is shown a modification in which the guide J' is pivoted to an arm $g'$, that is integral with the rod $g$ and extends upward therefrom. The position of the pivoted guide J' on the bar $g$ also varies the path of the reel-board, making it nearer a circle or more elliptical.

In operation it is necessary that the reel move with considerable rapidity; but this rapid movement is not attended with a pounding of the grain on the heads as the reel-board enters it, as the board comes down more nearly vertical than does the ordinary revolving-wheel reel-board, thus parting and slipping between the stalks. Its movement at that time is also slower. A little later, as it carries the grain back and supports it for the knife, it moves faster; but when the board has reached the knife its movement again becomes less rapid, preventing the throwing of the grain upon the platform or scattering it to the rear. On its upward path, after it is cut, it makes no difference how fast it moves, as it is out of the grain, and it then rapidly increases its motion.

Having fully described my invention, but not intending that such description shall limit me to the precise construction and form of parts shown, what I claim is—

1. In combination, to form the reel of a harvester, a crank reel-shaft mounted in bearings on the frame of the harvester, mechanism for giving motion thereto, a reel-board pivoted thereon, a controlling-rod extended therefrom, and a guide pivoted upon the controlling-rod of the reel-frame, substantially as and for the purpose specified.

2. In combination, to form a reel of a double reel-frame, a crank-shaft mounted in bearings therein, mechanism for giving motion to the shaft, controlling devices to retain the reel-frame in position, a reel-board, arms rigid therewith pivoted upon the crank-arm of the reel-shaft, a controlling-arm extending from one of the arms of the reel-board, and a pivoted guide, through which the controlling-arm moves, mounted upon the connection that controls the upper arm of the reel-frame, all substantially as and for the purpose specified.

WILLIAM FONGER.

Witnesses:
JOHN V. A. HASBROOK,
JOHN M. CULVER.